United States Patent
Im et al.

(10) Patent No.: US 11,861,815 B2
(45) Date of Patent: Jan. 2, 2024

(54) COMPOSITE IMAGE CREATING METHOD, COMPOSITE IMAGE CREATING APPARATUS, AND COMPUTER PROGRAM STORED IN RECORDING MEDIUM TO EXECUTE THE METHOD

(71) Applicant: AGENCY FOR DEFENSE DEVELOPMENT, Daejeon (KR)

(72) Inventors: Hyun Ja Im, Daejeon (KR); Jeongseaok Kim, Daejeon (KR); Daeyeon Kim, Daejeon (KR); Kwang Woo Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/188,481

(22) Filed: Mar. 23, 2023

(65) Prior Publication Data
US 2023/0306570 A1 Sep. 28, 2023

(30) Foreign Application Priority Data
Mar. 23, 2022 (KR) .......................... 10-2022-0036075

(51) Int. Cl.
*G06T 5/50* (2006.01)
*G06T 3/40* (2006.01)
(Continued)

(52) U.S. Cl.
CPC .................. *G06T 5/50* (2013.01); *G06T 3/40* (2013.01); *G06T 5/002* (2013.01); *G06T 7/62* (2017.01);
(Continued)

(58) Field of Classification Search
None
See application file for complete search history.

(56) References Cited

U.S. PATENT DOCUMENTS

| 2007/0183564 | A1 | 8/2007 | Li et al. |
| 2015/0256819 | A1* | 9/2015 | Panahpour Tehrani ..................... H04N 19/503 345/420 |

(Continued)

FOREIGN PATENT DOCUMENTS

| JP | 2007203046 | 8/2007 |
| JP | 2007225423 | 9/2007 |

(Continued)

OTHER PUBLICATIONS

"Office Action of Korea Counterpart Application", dated Jun. 21, 2022, with English translation thereof, p. 1-p. 10.
(Continued)

*Primary Examiner* — James A Thompson
(74) *Attorney, Agent, or Firm* — JCIPRNET

(57) ABSTRACT

Provided are a method and apparatus for creating a composite image, by which the state of a target may be effectively expressed, and a computer program stored in a recording medium to execute the method. The composite image creating method, performed by a computing apparatus, of synthesizing an input image to a target image, includes identifying information of the input image by obtaining the input image, generating a projected image based on information about a position in units of sub-pixels for the target image of the input image, by using information of the input image, generating a reduced image by reducing the projected image at a ratio corresponding to the target image, and synthesizing the reduced image to the target image.

7 Claims, 7 Drawing Sheets

(51) Int. Cl.
  *G06T 7/62* (2017.01)
  *G06T 7/70* (2017.01)
  *G06T 5/00* (2006.01)

(52) U.S. Cl.
  CPC ...... *G06T 7/70* (2017.01); *G06T 2207/20221* (2013.01)

(56) References Cited

U.S. PATENT DOCUMENTS

| | | | |
|---|---|---|---|
| 2016/0188992 A1* | 6/2016 | Hiraga | G06V 10/44 382/199 |
| 2017/0024006 A1 | 1/2017 | Kwon et al. | |
| 2023/0068727 A1* | 3/2023 | Saphier | A61C 9/006 |

FOREIGN PATENT DOCUMENTS

| | | |
|---|---|---|
| KR | 20170011674 | 2/2017 |
| KR | 101738129 | 5/2017 |
| KR | 20210155873 | 12/2021 |

OTHER PUBLICATIONS

"Written Decision on Registration of Korea Counterpart Application", dated Aug. 12, 2022, with English translation thereof, p. 1-p. 8.

* cited by examiner (a)　　　　　　　　　　　(b)

COMPOSITE IMAGE CREATING METHOD, COMPOSITE IMAGE CREATING APPARATUS, AND COMPUTER PROGRAM STORED IN RECORDING MEDIUM TO EXECUTE THE METHOD

CROSS-REFERENCE TO RELATED APPLICATION

This application claims the benefit of Korean Patent Application No. 10-2022-0036075, filed on Mar. 23, 2022, in the Korean Intellectual Property Office, the disclosure of which is incorporated herein in its entirety by reference.

BACKGROUND

1. Field

The disclosure relates to a composite image creating method, a composite image creating apparatus, and a computer program stored in a recording medium to execute the method.

2. Description of the Related Art

Recently, as research on image-based target tracking techniques has actively been conducted, research on creating composite images for algorithm verification is also increasing. The research is used to verify the target tracking technique in various aspects with respect to an environment where there is not much data. The size of a target varies depending on a distance between a target and a camera and the characteristics of the camera, as well as a change in the size of an actual target. Furthermore, the position of a target varies depending on the distance between the target and the camera and the position of the camera.

A composite image is created through the synthesis of a target and a background. To this end, a technology to project (project) the created target onto the background is required. Projection refers to a process of moving pixel values when the arrangement of pixels is changed, by finding the coordinates of a target image (background) where the coordinates of an input image (target) will be newly placed. In this state, if the sizes of the input image and the target image are not the same, problems such as holes or overlapping occur. A hole refers to a pixel that is not projected in the process of producing the coordinates of a target image from the coordinates of an input image, and mainly occurs when an image is enlarged or rotated. Overlapping refers to projection of multiple pixels of an input image onto one pixel of a target image, and mainly occurs when an image is reduced. An inverse direction projection to solve the above problem by calculating an inverse transform centered on the coordinates of the target image, finding the coordinates of the corresponding input image, and retrieving a pixel value, do not have holes or overlapping, but the quality of the image deteriorates. Projections according to the existing methods include the inverse transform projection to solve the holes or overlapping, interpolation to solve the deterioration of image quality, and the like, but all methods are transform of pixel units, so it may be difficult to describe sub-pixels during projection.

For a long-range target, there are frequent occasions in which the size of a target in an image changes to less than one pixel (hereafter, referred to as a sub-pixel) or the position changes to a sub-pixel position, but it is difficult to express such occasion. Furthermore, it is difficult to express when a target exists on a boundary between pixels or when shaking in units of sub-pixels occurs due to the shaking caused by a gimbal in a system to which the gimbal is attached. In this case, when an image is generated in units of pixels, the image is generated while a change in units of sub-pixels is disregarded. However, the target state is an item that greatly affects target tracking performance, and precise description of sub-pixels is required for accurate verification of an algorithm.

SUMMARY

Provided are a method and apparatus for creating a composite image, by which the state of a target may be effectively expressed, and a computer program stored in a recording medium to execute the method. However, such an objective is an example, and the scope of the disclosure is not limited thereby.

According to an aspect of the disclosure, a composite image creating method, performed by a computing apparatus, of synthesizing an input image to a target image, includes identifying information of the input image by obtaining the input image, generating a projected image based on information about a position in units of sub-pixels for the target image of the input image, by using information of the input image, generating a reduced image by reducing the projected image at a ratio corresponding to the target image, and synthesizing the reduced image to the target image.

The identifying of the information of the input image may include obtaining the input image having a minor-axis size and a major-axis size of a preset threshold value or more, and identifying information about a size and position of a target included in the input image.

The projection operation may include generating the projected image by matching the input image with a position corresponding to the information about the position in units of sub-pixels, in a frame having the same size as a size of the input image.

The reduction operation may include generating the reduced image by reducing the projected image based on a ratio corresponding to the target image indicating a size ratio of the input image to the target image.

The projection operation may include generating the projected image that reflects a blur image by reflecting the blur image by a blur phenomenon to the input image.

According to another aspect of the disclosure, a computer program stored in a recording medium to execute, by using a computing apparatus, the method described above.

According to another aspect of the disclosure, a composite image creating apparatus for synthesizing an input image to a target image includes a processor configured to: identify information of the input image by obtaining the input image, generate a projected image based on information about a position in units of sub-pixels for the target image of the input image, by using information of the input image, generate a reduced image by reducing the projected image at a ratio corresponding to the target image, and synthesize the reduced image to the target image.

The processor may be further configured to: obtain the input image having a minor-axis size and a major-axis size of a preset threshold value or more, and identify information about a size and position of a target included in the input image.

The processor may be further configured to generate the projected image by matching the input image with a position corresponding to the information about the position in units of sub-pixels, in a frame having the same size as a size of the input image.

The processor may be further configured to generate the reduced image by reducing the projected image based on a ratio corresponding to the target image indicating a size ratio of the input image to the target image.

The processor may be further configured to generate the projected image that reflects a blur image by reflecting the blur image by a blur phenomenon to the input image.

Other aspects, features, and advantages than those described above will become apparent from the following drawings, claims, and detailed description of the disclosure

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
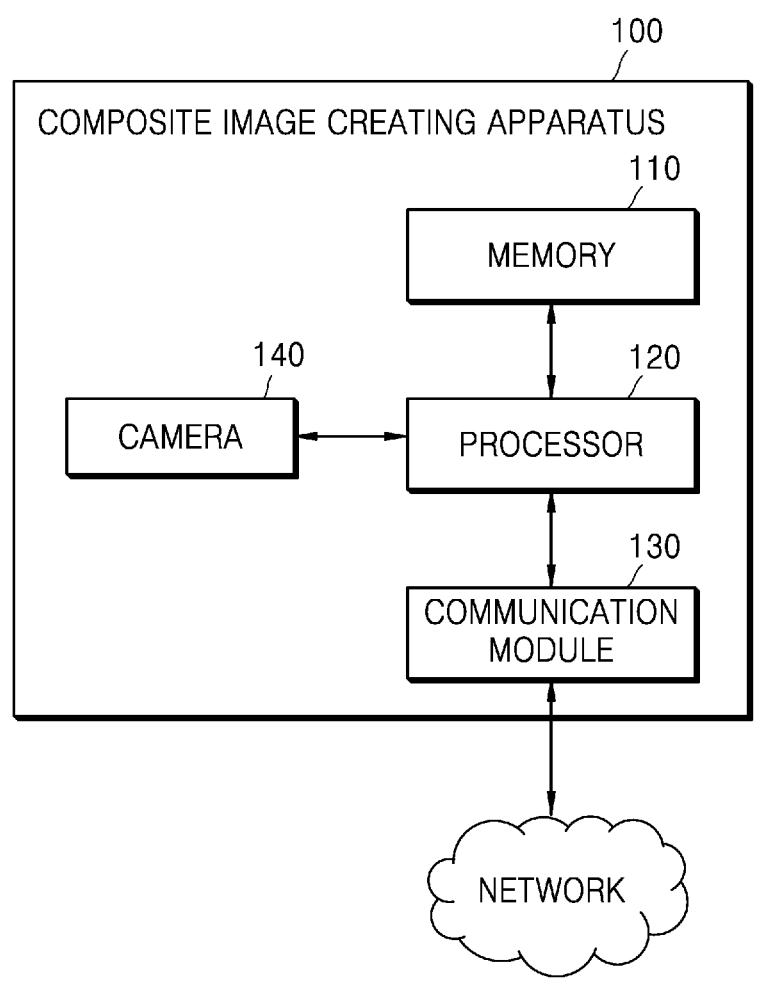
FIG. 1 is a block diagram of the configuration and operation of a composite image creating apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

Hereinafter, exemplary embodiments will be described in detail with reference to the accompanying drawings, and in the description with reference to the drawings, the same or corresponding constituents are indicated by the same reference numerals and redundant descriptions thereof are omitted.

In the following embodiment, it will be understood that although the terms "first," "second," etc. may be used herein to describe various components, these components should not be limited by these terms. The expression of singularity in the specification includes the expression of plurality unless clearly specified otherwise in context. Furthermore, when a part may "include" or "have" a certain constituent element, unless specified otherwise, it may not be construed to exclude another constituent element but may be construed to further include other constituent elements.

Sizes of elements in the drawings may be exaggerated for convenience of explanation. For example, since sizes and thicknesses of elements in the drawings are arbitrarily illustrated for convenience of explanation, the following embodiments are not limited thereto.

In the following embodiment, it will be understood that when a layer, region, or component is referred to as being "formed on" another layer, region, or component, it can be directly or indirectly formed on the other layer, region, or component. That is, for example, intervening layers, regions, or components may be present. It will be understood that when a layer, region, or component is referred to as being "connected to" another layer, region, or component, it can be directly connected to the other layer, region, or component or indirectly connected to the other layer, region, or component via intervening layers, regions, or components.

In the following description, the embodiment of the disclosure is described with reference to the accompanying drawings so that one skilled in the art to which the disclosure pertains can work the disclosure.

Figure 2:
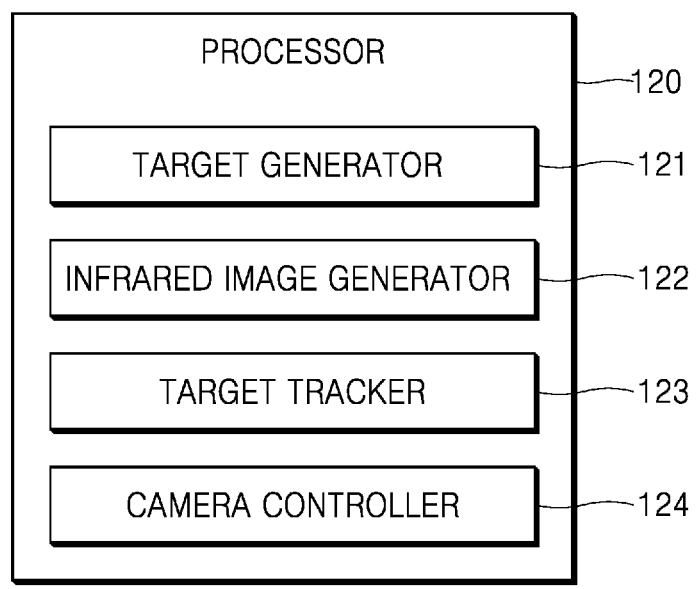
FIG. 2 is a block diagram of the configuration of a processor of a composite image creating apparatus according to an embodiment.

FIG. 1 is a block diagram of the configuration and operation of a composite image creating apparatus 100 according to an embodiment, and FIG. 2 is a block diagram of the configuration of a processor of the composite image creating apparatus 100, according to an embodiment.

First, referring to FIG. 1, the composite image creating apparatus 100 according to an embodiment may include a memory 110, a processor 120, a communication module 130, and a camera 140. However, the disclosure is not limited thereto, and the composite image creating apparatus 100 may further include other constituent elements or some constituent elements may be omitted. A constituent element of the composite image creating apparatus 100 may be divided into a plurality of apparatuses, or a plurality of constituent elements may in incorporated into one apparatus.

The memory 110, as a computer-readable recording medium, may include a permanent mass storage device, such as a random access memory (RAM), a read only memory (ROM), and a disk drive. Furthermore, the memory 110 may temporarily or permanently store a program code for controlling the composite image creating apparatus 100 and data for creating a composite image.

The processor 120 may identify information of an input image by obtaining the input image, generate a projected image by projecting the input image based on information about a position in units of sub-pixels for a target image of the input image by using the information of the input image, generate a reduced image by reducing the projected image at a ratio corresponding to the target image, and synthesize the reduced image to the target image.

The communication module 130 may provide a function to communicate with an external apparatus through a network. As an example, a request generated by the processor 120 of the composite image creating apparatus 100 according to a program code stored in a recording apparatus such as the memory 110 may be transmitted to an external apparatus through a network under the control of the communication module 130. Reversely, control signals, instructions, contents, files, and the like provided under the control of a processor of the external apparatus may be received by the composite image creating apparatus 100 via the communication module 130 through a network. For example, control signals, instructions, and the like of the external server received via the communication module 130 may be transmitted to the processor 120 or the memory 110, and contents, files, and the like may be stored in a storage medium that the composite image creating apparatus 100 may further include.

A communication method is not limited, and may include not only a communication method using a communication network (e.g., a mobile communication network, wired Internet, wireless Internet, and a broadcast network) that a network may include, but also short-range wireless communication between devices. For example, the network may include one or more networks among a personal area network (PAN), a local area network (LAN), a campus area network (CAN), a metropolitan area network (MAN), a wide area network (WAN), a broadband network (BBN), and the Internet. Furthermore, the network may include one or more network from a network topology including a bus network, a start network, a ring network, a mesh network, a star-bus network, a tree or hierarchical network, and the like, but the disclosure is not limited thereto.

Furthermore, the communication module 130 may communicate with the external apparatus through a network. A communication method is not limited, but the network may be a short-range wireless communication network. For example, the network may be Bluetooth, Bluetooth Low Energy (BLE), and a WiFi communication network.

The camera 140 may be an apparatus that obtains data of target and background images. For example, the camera 140 may be an infrared camera. For example, the camera 140 may obtain an image of a target. Furthermore, the camera 140 may obtain a background image of a target.

Furthermore, the composite image creating apparatus 100 according to an embodiment may include an input/output interface. The input/output interface may be a device for interfacing with input/output devices. For example, the input device may include a device such as a keyboard, a mouse, or the like, and the output device may include a device such as a display to display a communication session of an application. In another example, the input/output interface may be a device for interfacing with a device such as a touch screen having a single incorporated function for input and output. In a detailed example, the processor 120 of the composite image creating apparatus 100, when processing instructions of a computer program loaded in the memory 110, may display a service screen or content formed by using data provided by the external apparatus, on a display, through the input/output interface.

Furthermore, in some embodiments, the composite image creating apparatus 100 may include more constituent elements than the constituent elements of FIG. 1. For example, the composite image creating apparatus 100 may be implemented to include at least some of the input/output device described above or other constituent elements, such as a battery for supplying power to internal constituent elements, a charging apparatus, various sensors, a database, and the like.

The internal configuration of the processor 120 of the composite image creating apparatus 100 according to an embodiment is described below in detail with reference to FIG. 2. The processor 120 described below is assumed to be the processor 120 of the composite image creating apparatus 100 illustrated in FIG. 1, for ease of understanding.

The processor 120 of the composite image creating apparatus 100 according to an embodiment may include a target generator 121, an infrared image generator 122, a target tracker 123, and a camera controller 124. For example, the target generator 121 may generate a target according to the type, size, and position of a target. The infrared image generator 122 may generate a background according to the properties of an infrared camera and reproduce a target. The target tracker 123 may track the target based on an image. The camera controller 124 may change the position of a camera according to a target tracking result. For example, when the target generator 121 generates a target, the size of the target may vary depending on not only a size change of a real target, but also a distance between the target and a camera and the properties of the camera.

Furthermore, the position of a target may vary depending on a distance between the target and a camera and the position of the camera. The composite image creating apparatus 100 may also represent not only a short-range target, but also a long-range target.

In some embodiments, the constituent elements of the processor 120 may be selectively included or excluded. Furthermore, in some embodiments, the constituent elements of the processor 120 may be separated or incorporated for the representation of a function of the processor 120.

Figure 3:
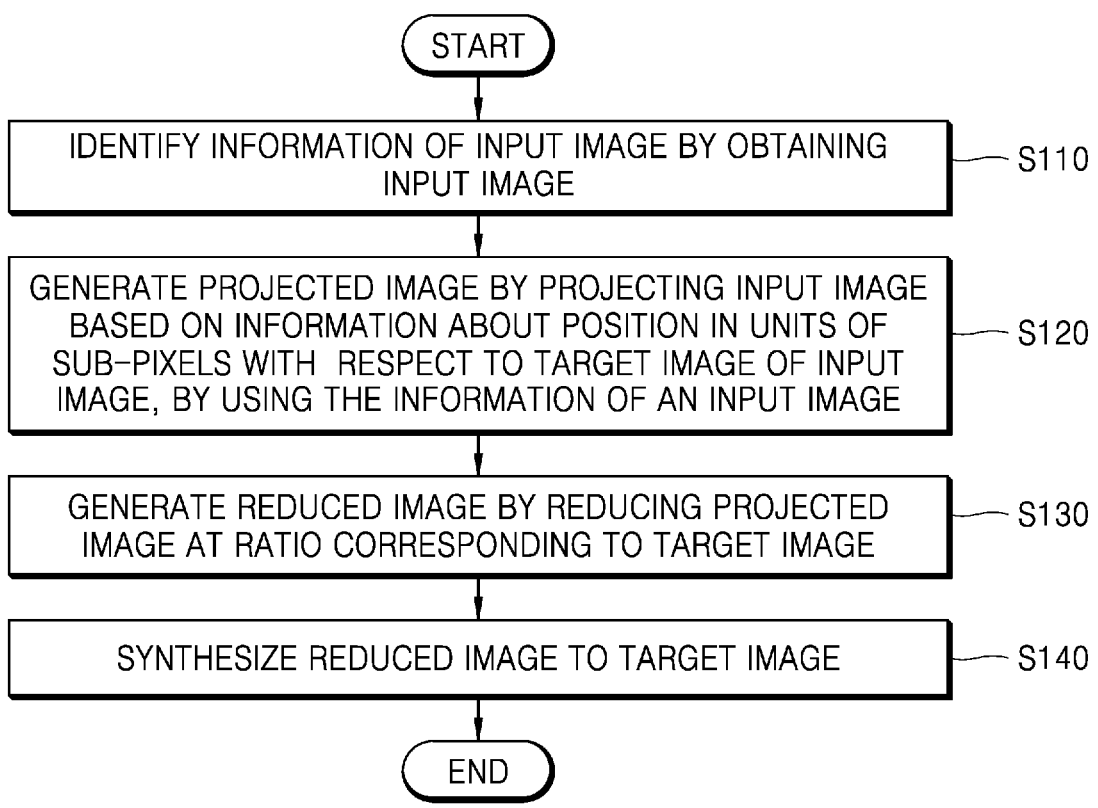
FIG. 3 is a flowchart of a composite image creating method according to an embodiment.

The processor 120 and the constituent elements of the processor 120 may control the composite image creating apparatus 100 to perform operations (S110 to S140) included in the composite image creating method of FIG. 3. For example, the processor 120 and the constituent elements of the processor 120 may be implemented to execute instructions according to code of an operating system and code of at least one program included in the memory 110. The constituent elements of the processor 120 may be difference function of the processor 120 performed by the processor 120 according to the instructions provided by the program code stored in the composite image creating apparatus 100. The internal configuration and detailed operation of the processor 120 is described with reference to the flowchart of the composite image creating method of FIG. 3.

FIG. 3 is a flowchart of a composite image creating method according to an embodiment.

Referring to FIG. 3, in operation S110, the processor 120 may identify information of an input image by obtaining the input image. For example, the processor 120 may obtain an input image including a target, and identify information about the minor-axis size and major-axis size of the input image, information about the size of the target, information about the position of the target in the input image, and the like.

The processor 120 according to an embodiment may obtain an input image having a minor-axis size and a major-axis size of a preset threshold value or more. For example, the processor 120 may obtain an input image having a minor-axis size and a major-axis size of a preset threshold value or more, based on the size information of the obtained input image. Furthermore, the processor 120 may enlarge the size of an input image to a minor-axis size and a major-axis size of a preset threshold value or more, based on the size information of the obtained input image.

Furthermore, the processor 120 may identify information about the size and position of the target included in the input image. For example, the processor 120 may identify the minor-axis size and major-axis size of the target included in the input image, and position information about the position of the target with respect to the target. For example, target's position information may include coordinates information about the position of the target with respect to the input image.

In operation S120, the processor 120 may generate a projected image by projecting an input image based on information about the position in units of sub-pixels for a target image of an input image, by using the information of an input image. For example, the processor 120 may project the input image to a frame of the same size as that of the input image based on information about the position in units of sub-pixels where the input image is located in the target image, by using the minor-axis size and major-axis size of an input image, and generate a projected image. For example, the information about the position in units of sub-pixels may include coordinates information.

The processor 120 according to an embodiment may generate a projected image by matching the input image with a position corresponding to the information about the position in units of sub-pixels may generate a projected image, in a frame having the same size as that of the input image. For example, the processor 120 may generate a projected image by matching the input image with a position corresponding to the coordinates information in units of sub-pixels of a frame having the same size as that of the input image.

The processor 120 according to an embodiment may generate a projected image that reflects a blur image by reflecting, in the input image, the blur image due to a blur phenomenon. For example, the processor 120 may generate a projected image that reflects a blur image by reflecting the blur image generated with respect to a target of the input image in the input image. For example, a blur image may represent an image in which the boundary of a target is blurred by light spreading.

In operation S130, the processor 120 may generate a reduced image by reducing the projected image at a ratio corresponding to the target image. For example, the processor 120 may generate a reduced image by reducing the projected image based on a relative ratio of an input image to be synthesized in the target image and the projected image.

The processor 120 according to an embodiment may generate a reduced image by reducing the projected image based on a ratio corresponding to the target image indicating a size ratio of the input image to the target image. For example, the ratio corresponding to the target image indicating a size ratio of the input image to the target image may be predetermined and stored in a memory.

In operation S140, the processor 120 may synthesize the reduced image to the target image. For example, the processor 120 may synthesize the reduced image to the target image based on the position of a target in the target image according to the position of the target.

According to an embodiment, a composite image creating apparatus according to an embodiment may represent the state (size, position, blur, etc.) of a target in units of sub-pixels during the creation of a composite image.

Figure 4:
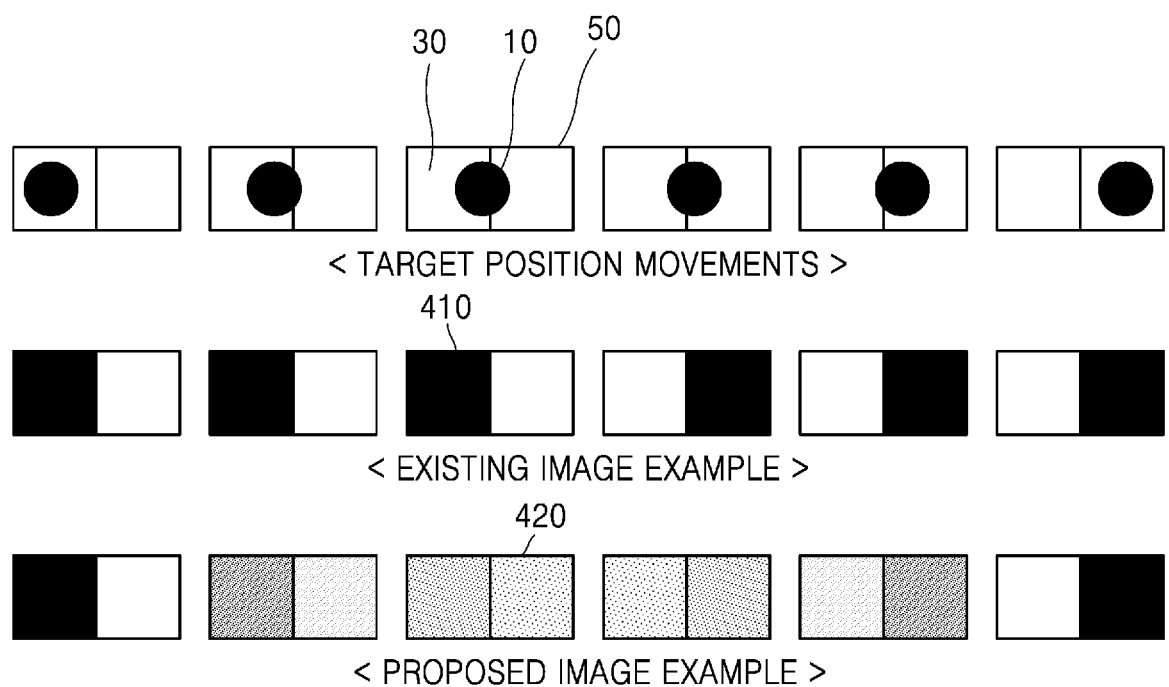
FIG. 4 illustrates a comparison between a composite image creating method according to an embodiment and a composite image creating method according to the related art.

FIG. 4 illustrates a comparison between a composite image creating method according to an embodiment and a composite image creating method according to the related art.

Referring to FIG. 4, in the creation of a composite image with respect to a moving target, as illustrated in FIG. 4, when a target 10 exists on a boundary between a pixel 30 and a pixel 50, it is difficult to represent the target 10. In this case, when an image is generated in a pixel unit, a composite image 410 is generated while a change in units of sub-pixels is ignored. However, the state of the target 10 is an item that greatly affects target tracking performance so that a precise description for a sub-pixel is needed for accurate verification of an algorithm. According to an embodiment, a composite image 420 may be created by reflecting the state (size, position, blur, etc.) of the target 10 in units of sub-pixels.

Figure 5:
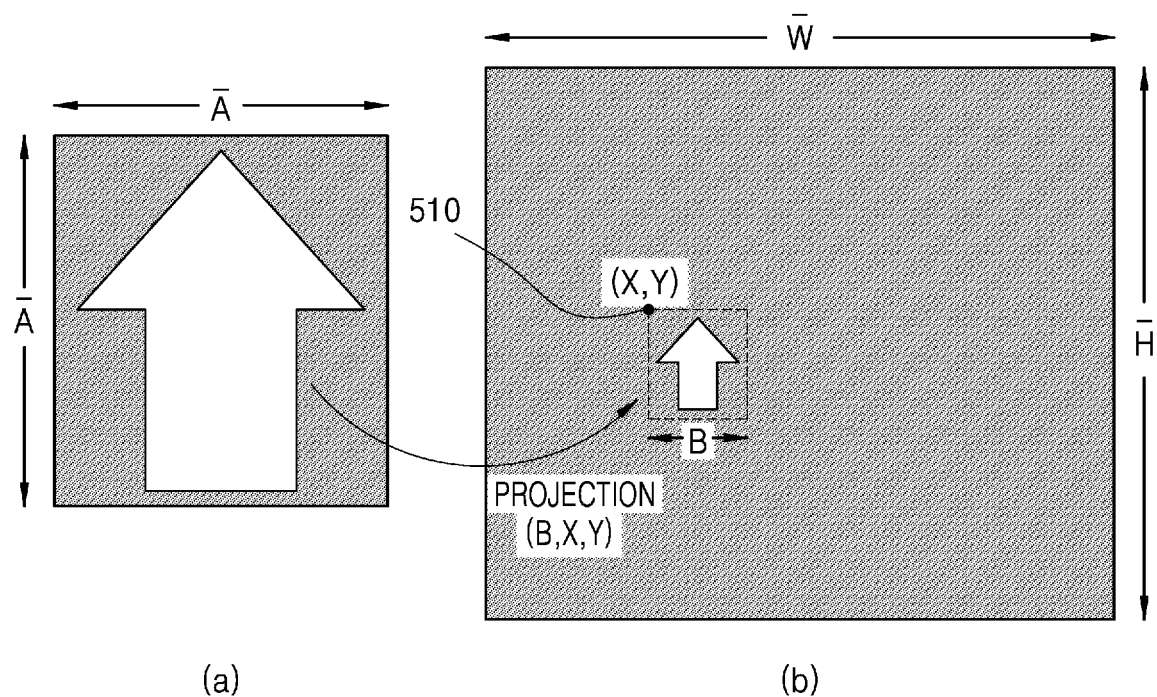
FIG. 5 illustrates a composite image creating method according to the related art.

FIG. 5 illustrates a composite image creating method according to the related art.

Referring to FIG. 5, to explain the composite image creating method according to the related art, for a certain real number, an integer value may be defined as and a decimal (sub-pixel) value may be defined as. Furthermore, as illustrated in FIG. 5, projecting an image (a) to an image (b) with a size of B×B at coordinates 510 of X (x-axis coordinate) and Y (y-axis coordinate) by using an image processing technique such as perspective projection and the like may be defined as <B, X, Y>.

In the perspective projection, first, a transformation matrix is obtained from the positions of the four corners of a rectangular area to be transformed and the positions of the four corners after transformation, and after determining which position of the original image the position of each pixel after transformation corresponds to, from the obtained transformation matrix, projection is performed by filling pixel values of the original image at the corresponding positions in pixels of the transformed image. For example, assuming that the pixel position of an image corresponding to an n-th pixel of the transformed image is m, the value of the n-th pixel may be a value of an m-th pixel of the original image. However, when the position m is accurately an integer, the pixel value of the position may be used. Otherwise, values of surrounding pixels of the position may be used. A linear interpolation (inter-linear) is one of the most widely used methods. The linear interpolation is a weighted sum of the four pixel values closest to position m. In this case, a weight is inversely proportional to the distance between the position m and each pixel, and the sum of the four weights is 1. However, when the size of an object is reduced with a high magnification as illustrated in FIG. 5, as each pixel of a transformed image (b) is a value representing a value of a large area of an original image (a), using the linear interpolation that uses only four surrounding pixel values may cause aliasing.

Figure 6:
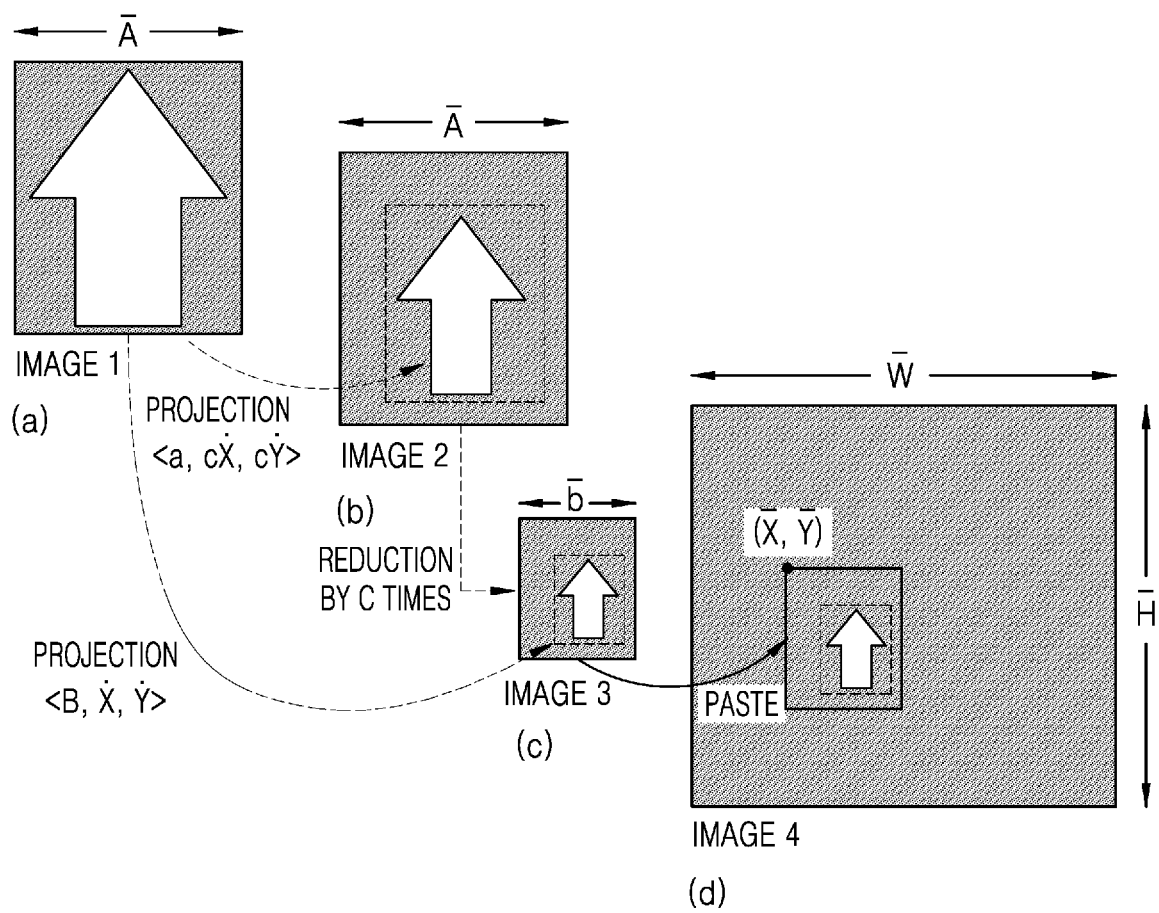
FIG. 6 illustrates a composite image creating method according to an embodiment.

FIG. 6 illustrates a composite image creating method according to an embodiment.

Referring to FIG. 6, the composite image creating method according to an embodiment may include a method of projecting the original image through two separate operations of projection processing using linear interpolation and reduction processing using area interpolation (inter-area) that is widely used for image reduction. For example, as illustrated in FIG. 6, an image 1(*a*) includes an input image, that is, the shape of a target to be projected, and an image 2(*b*) is a projected image of reflecting decimal points of the positions to which the image 1(*a*) is to be projected. Furthermore, an image 3(*c*) is a reduced image by reflecting the size of the input image to be projected to a target image, and an image 4(*d*) is the target image to which the input image is projected.

In FIG. 6, $\bar{A}$ denotes the size (e.g., the minor-axis or x-axis size) of the original image, B denotes the size of a reduced image to be projected, and X and Y denote coordinates of the position of a reduced image to be projected with respect to the target image. Here, B, X, and Y may be expressed by separating an integer part from a decimal part as shown in Equation 1.

$$B=\overline{B}+\dot{B} X=\overline{X}+\dot{X} Y=\overline{Y}+\dot{Y} \qquad \text{<Equation 1>}$$

In an operation from the image 1 (*a*) to the image 2 (*b*) of the composite image creating method, to reflect the position of a decimal point in units of sub-pixels, as illustrated in the image 2 (*b*) of FIG. 6, a projected image may be generated by projecting (<a, c$\dot{X}$, c$\dot{Y}$>) an input image to a position corresponding to a decimal point within a frame having the same size $\overline{A}$. Here, $\dot{X}$ and $\dot{Y}$ are decimal parts of X and Y as described above, a is c×B, and c is $\overline{A}/\overline{b}$. In this state, $\overline{b}$ that determines the value of c is a value greater than $\overline{B}$ that is an integer part of B, by an integer $\overline{M}$. ($\overline{M}$ will be described below in detail). In summary, the above description may be expressed by Equation 2 below.

$$a = c \times B \qquad \text{<Equation 2>}$$
$$x = \frac{\overline{A}}{\overline{b}}$$
$$\overline{b} = \overline{B} + \overline{M}$$

Next, in an operation from the image 2 (*b*) to the image 3 (*c*) of the composite image creating method, the image 3 (*c*) may be generated as a reduced image having a size $\overline{b}$ by reducing the image 2 (*b*) of FIG. 6 by c times. Here, the size of the target (i.e., a dashed box in the image 3 (*c*) of FIG. 6) is B, and the position of the target (i.e., the coordinates in the upper left corner of the dashed box in the image 3 (*c*) of FIG. 6) is $\dot{X}$ and $\dot{Z}$.

Next, in an operation from the image 3 (*c*) to the image 4 (*d*) of the composite image creating method, as illustrated in the image 4 (*d*) of FIG. 6, the target of the image 1 (*a*) is projected to the coordinates (X, Y) with the size of B through a paste work to paste the reduced image at the coordinates ($\overline{X}$, $\overline{Y}$). Here, the distance between the position to which the image 3 (*c*) is pasted (i.e., in the upper left corner of a solid box in the image 4 (*d*) of FIG. 6) and the position of the target (i.e., in the upper left corner of the dashed box in the image 4 (*d*) of FIG. 6) is (X, Y), and the maximum distance in each axis is 1 or less. Accordingly, when $\overline{b}$ (i.e., the size of the solid box in the image 4 (*d*) of FIG. 6) is greater than B (i.e., the size of the dashed box in the image 4 (*d*) of FIG. 6) only by 1 or more, the decimal point position may be sufficiently represented. Accordingly, in the composite image creating method according to an embodiment, the conditions of Equation 3 below may be satisfied.

$$\overline{b} \geq B+1 \overline{B}+\overline{M} \geq B+1 \overline{M} \geq B-\overline{B}+1=\dot{B}+1 \qquad \text{<Equation 3>}$$

In the Equation above, as the maximum value of $\dot{B}$ is less than 1, when $\overline{M}$ is two or more, the conditions of Equation 3 above may be satisfied.

As such, in performing projection, by separating reduction and projection and performing projection reflecting a decimal point and selecting a size of reduction that represents by including the same, a target image may be projected to a decimal point (i.e., a sub-pixel) without distortion of an image.

In the embodiment, the following method may be considered to reflect the target state change in units of sub-pixels.

a) A target image pre-processing operation is added before projecting a target to a background to represent a change even when a target state changes in units of sub-pixels.

b) In the target image pre-processing operation, an image having a relatively large size is received as a target image. Then, a process of reducing through a reduction interpolation is added after reflecting an area corresponding to the units of decimal points of the coordinates and size of a background image to be actually projected, in a state of a large-sized target. As the large-sized image is used in reduction, resolution is not lowered even when the target image is enlarged.

c) A target generated through the target image pre-processing is projected to the background image by using perspective projection transform.

Figure 7:
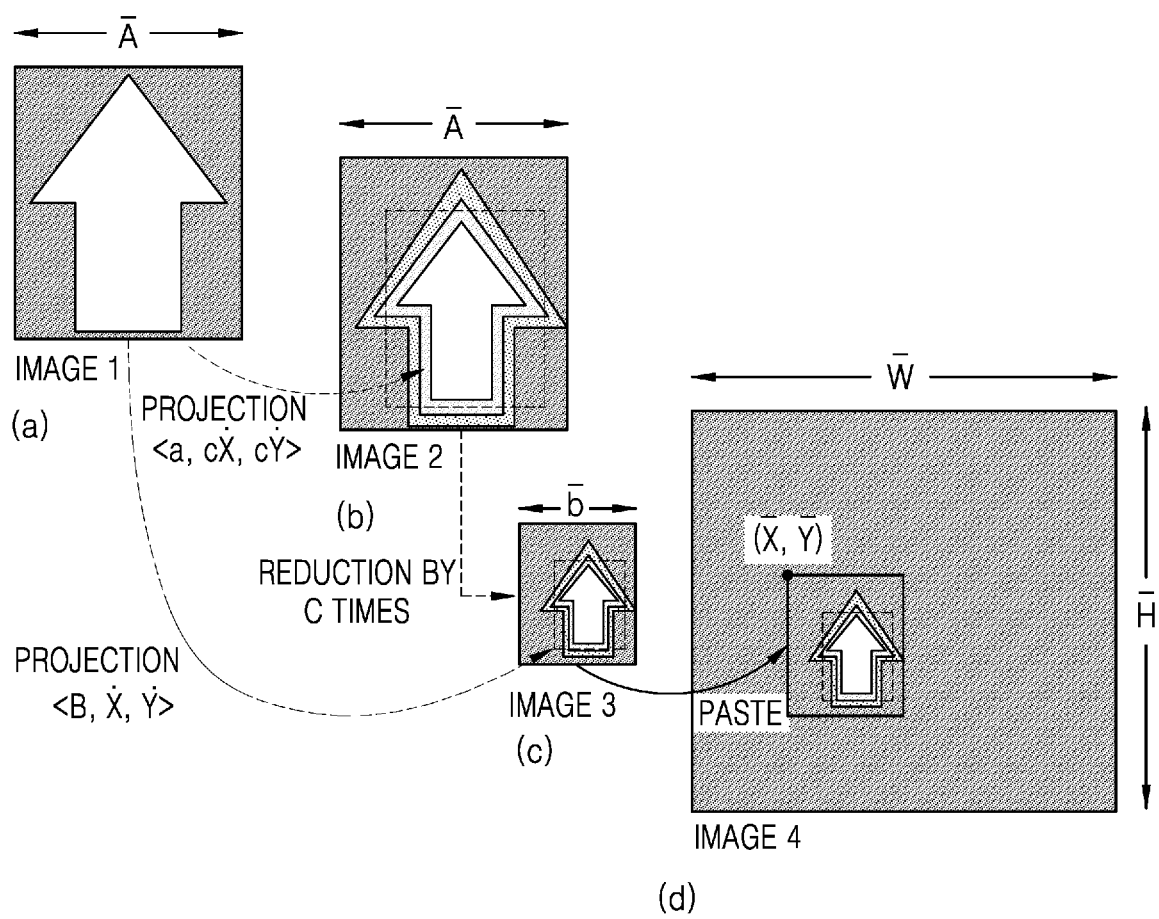
FIG. 7 illustrates a composite image creating method according to another embodiment.

FIG. 7 illustrates a composite image creating method according to another embodiment.

Referring to FIG. 7, the composite image creating method according to an embodiment may also represent blur of an image in units of sub-pixels. Generally, when light comes into a camera, due to the properties of light, the properties of a lens and a detector, and the like, image may be focused on a screen to be blur. When such a phenomenon is represented in a composite image generated in FIG. 5, the size and position of blur is also distorted as much as the image is distorted. As a method to address the above issue, in the composite image creating method according to an embodiment described above, blur may be applied in the image 2 (*b*) of FIG. 6 in which the position of a decimal point is reflected through projection.

For example, as illustrated in FIG. 7, when blur is applied to the image 2 (*b*), blur may be represented in the units of decimal points. In this case, as the size of an image to which blur is applied is increased compared with the existing original image, by reflecting the same, the $\overline{M}$ value may be set to be greater than the existing minimum reference 2 by the blur size.

According to an embodiment, for a long-range small target, a state of the target may be generated in units of sub-pixels. The long-range small target has a size within one pixel in an infrared image. In this state, a state of target focused between pixels may be represented. Target tracking algorithm performance is greatly dominated depending on a case in which a small target is all present in one pixel and a case in which a small target is focused on a boundary between pixels, which may be analyzed.

Furthermore, according to an embodiment, changes in size and movement of a target may be seamlessly generated. When a target is gradually enlarged or continuously moved, the presentation in the units of pixels is expressed such that an image is discontinuous, whereas the presentation in units of sub-pixels is expressed such that an image is smoothly connected.

Furthermore, according to an embodiment, the vibration of a system, such as a gimbal, a camera, and the like, may be represented. For a gimbal system, slight tremor is caused by a sensor and the like used therein. For a long-range target, a signal change increases even in slight tremor so as to affect tracking performance, which may be represented.

The apparatus and/or system described above may be implemented by a hardware component, a software component, and/or a combination of a hardware component and a software component. The apparatus and constituent elements described in the above embodiments may be implemented by using one or more general purpose computers or special purpose computers, for example, a processor, a controller, an arithmetic logic unit (ALU), a digital signal processor, a microcomputer, a field programmable gate array (FPGA), a programmable logic unit (PLU), or any other apparatus capable of executing instructions and responding. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include a plurality of processing elements and a plurality of types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The program instructions recorded on a media may be those specially designed and constructed for the purposes, or they may be of the kind well-known and available to those having skill in the computer software arts. Examples of non-transitory computer-readable media include magnetic media such as hard disks, floppy disks, and magnetic tape, optical media such as CD ROM disks and DVD, magneto-optical media such as floptical disks, and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments.

In the above, although the present disclosure has been described by specific matters such as specific constituent elements or the like, limited embodiments, and the drawings, those skilled in the art to which the present disclosure pertains could make various modifications and changes from these descriptions. For example, even when the described techniques may be performed in an order different from the method described, and/or the components of the described system, structure, device, circuit, etc. may be coupled or combined in a different form than the method described, or replaced or substituted by other components or equivalents, appropriate results may be achieved.

Therefore, other implementations, some embodiments, and equivalents of the claims are within the scope of the claims described below.

According to an embodiment configured as described above, a method and apparatus for creating a composite image, by which the state of a target may be effectively expressed, and a computer program stored in a recording medium to execute the method may be implemented. The scope of the disclosure is not limited by the above effects.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A composite image creating method, performed by a computing apparatus, for synthesizing an input image to a target image, the composite image creating method comprising:
    an identification operation of identifying information of the input image by obtaining the input image;
    a projection operation of generating a projected image based on information about a position of a decimal point in units of sub-pixels for the target image of the input image, by using information of the input image to generate the projected image by matching the input image at a position corresponding to the decimal point within a frame having a same size as the input image;
    a reduction operation of generating a reduced image by reducing the projected image at a ratio corresponding to the target image;
    a synthesis operation of synthesizing the reduced image to the target image; and
    wherein the projection operation comprises generating the projected image that reflects a blur image by reflecting the blur image by a blur phenomenon to the input image.

2. The composite image creating method of claim 1, wherein the identifying of the information of the input image comprises obtaining the input image having a minor-axis size and a major-axis size of a preset threshold value or more; and
    identifying information about a size and position of a target included in the input image.

3. The composite image creating method of claim 1, wherein the reduction operation comprises generating the reduced image by reducing the projected image based on a ratio corresponding to the target image indicating a size ratio of the input image to the target image.

4. A non-transitory storage medium configured to store a computer program to be loaded into a processor to execute, by using a computing apparatus, the method of claim 1.

5. A composite image creating apparatus for synthesizing an input image to a target image, the composite image creating apparatus comprising:
    a processor configured to:
    identify information of the input image by obtaining the input image;
    generate a projected image based on information about a position of a decimal point in units of sub-pixels for the target image of the input image, by using information of the input image to generate the projected image by matching the input image at a position corresponding to the decimal point within a frame having a same size as the input image;

generate a reduced image by reducing the projected image at a ratio corresponding to the target image; and synthesize the reduced image to the target image, and wherein the processor is further configured to generate the projected image that reflects a blur image by reflecting the blur image by a blur phenomenon to the input image.

6. The composite image creating apparatus of claim 5, wherein the processor is further configured to: obtain the input image having a minor-axis size and a major-axis size of a preset threshold value or more; and identify information about a size and position of a target included in the input image.

7. The composite image creating apparatus of claim 5, wherein the processor is further configured to generate the reduced image by reducing the projected image based on a ratio corresponding to the target image indicating a size ratio of the input image to the target image.

* * * * *